(12) United States Patent
Wang et al.

(10) Patent No.: US 8,177,309 B2
(45) Date of Patent: May 15, 2012

(54) BRAKING BOOSTER SYSTEM LEAK DIAGNOSTICS

(75) Inventors: Zhong Wang, Westland, MI (US); Tony T. Hoang, Warren, MI (US); Lan Wang, Troy, MI (US); Wenbo Wang, Novi, MI (US); Margaret C. Richards, Royal Oak, MI (US); Daryl A Wilson, Ypsilanti, MI (US)

(73) Assignee: GM Global Technology Operations LLC

( * ) Notice: Subject to any disclaimer, the term of this patent is extended or adjusted under 35 U.S.C. 154(b) by 659 days.

(21) Appl. No.: 12/119,710

(22) Filed: May 13, 2008

(65) Prior Publication Data

US 2009/0273230 A1 Nov. 5, 2009

Related U.S. Application Data

(60) Provisional application No. 61/049,859, filed on May 2, 2008.

(51) Int. Cl.
*B60T 8/88* (2006.01)

(52) U.S. Cl. ..................... 303/122; 303/115.3

(58) Field of Classification Search ............... 303/122, 303/122.03, 122.09, 122.1, 122.15, 115.3; 73/114.31, 114.32, 114.33, 114.34, 114.35, 73/114.36, 114.37, 121; 60/397; 188/356
See application file for complete search history.

(56) References Cited

U.S. PATENT DOCUMENTS

| | | | |
|---|---|---|---|
| 5,762,407 A * | 6/1998 | Stacey et al. | 303/155 |
| 6,443,535 B1 * | 9/2002 | Crombez et al. | 303/114.3 |
| 6,493,617 B1 | 12/2002 | Russell et al. | |
| 6,557,403 B1 * | 5/2003 | Kerns | 73/121 |
| 2003/0006891 A1 * | 1/2003 | Wild et al. | 340/438 |
| 2003/0230279 A1 * | 12/2003 | Burkhard et al. | 123/399 |
| 2004/0016417 A1 | 1/2004 | Kerns | |
| 2004/0017289 A1 * | 1/2004 | Brown, Jr. | 340/442 |
| 2004/0045526 A1 * | 3/2004 | Kolmanovsky et al. | 123/399 |
| 2005/0165522 A1 | 7/2005 | Lehner | |
| 2007/0119432 A1 * | 5/2007 | Wang et al. | 123/568.16 |

OTHER PUBLICATIONS

U.S. Appl. No. 12/013,676, filed Jan. 14, 2008, Zhong Wang.

\* cited by examiner

*Primary Examiner* — Bradley King
*Assistant Examiner* — Nicholas J Lane

(57) ABSTRACT

A leak diagnostic system for a vehicle comprises a calculation module and a diagnostic enabling module. The calculation module calculates a decay rate of a brake booster vacuum. The diagnostic enabling module selectively enables the decay rate calculation based on mass airflow (MAF) into an engine and engine vacuum.

22 Claims, 3 Drawing Sheets

BRAKING BOOSTER SYSTEM LEAK DIAGNOSTICS

CROSS-REFERENCE TO RELATED APPLICATIONS

This application claims the benefit of U.S. Provisional Application No. 61/049,859, filed on May 2, 2008. The disclosure of the above application is incorporated herein by reference.

This application is related to U.S. patent application Ser. No. 12/013,676, filed on Jan. 14, 2008. The disclosure of the above application is incorporated herein by reference in its entirety.

FIELD

The present disclosure relates to vehicle systems and more particularly to braking systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A hybrid powertrain includes both an electric machine and an internal combustion engine. Power may be supplied by the electric machine and/or the internal combustion engine during operation of the engine. Use of the electric machine may increase efficiency of a vehicle having such a hybrid powertrain.

The drivetrain of a hybrid vehicle is configured in either a parallel configuration or in a series configuration. In a hybrid vehicle having a parallel drivetrain, the electric machine works in parallel (i.e., in combination) with the engine. The parallel configuration combines the power and range advantages of the engine with the efficiency and electrical regeneration capability of the electric machine.

In a hybrid vehicle having a series drivetrain, the engine drives a generator to produce electricity for the electric machine, and the electric machine drives a transaxle. The series configuration allows the electric machine to assume some of the power responsibilities of the engine, thereby permitting the use of a smaller and more efficient engine.

Some vehicles, including some hybrid vehicles, include a brake booster that reduces the brake pedal effort required to achieve a desired vehicle braking force. This vacuum is depleted as a driver modulates a brake pedal. Accordingly, sufficient vacuum may be required to maintain the braking assistance provided by the brake booster.

SUMMARY

A leak diagnostic system for a vehicle comprises a calculation module and a diagnostic enabling module. The calculation module calculates a decay rate of a brake booster vacuum. The diagnostic enabling module selectively enables the decay rate calculation based on mass airflow (MAF) into an engine and engine vacuum.

In other features, the diagnostic enabling module enables the decay rate calculation when the MAF is greater than a predetermined MAF for a predetermined period and the engine vacuum is less than a predetermined vacuum for the predetermined period.

In further features, the calculation module calculates the decay rate based on a change in the brake booster vacuum over the predetermined period.

In other features, the leak diagnostic system further comprises a fault reporting module. The fault reporting module selectively reports presence of a leak in a brake booster system based on the decay rate.

In further features, the leak diagnostic system further comprises a diagnostic disabling module. The diagnostic disabling module prevents the reporting when at least one of a brake fluid pressure is greater than a predetermined pressure and the engine vacuum is greater than the brake booster vacuum.

In still further features, the diagnostic disabling module prevents the reporting when a change in the brake fluid pressure is greater than a predetermined pressure change.

In other features, the leak diagnostic system further comprises a filtering module. The filtering module applies a statistical filter to the decay rate, wherein the fault reporting module reports the leak based on an output of the statistical filter.

In further features, the statistical filter is an exponentially weighed moving average filter.

In still further features, the fault reporting module reports the leak when the output is greater than a predetermined value.

In other features, the fault reporting module determines a size of the leak based on the output and reports the size of the leak.

In still other features, operation of the engine is activated based on the brake booster vacuum.

A diagnostic method comprises calculating a decay rate of a brake booster vacuum and selectively enabling the calculating based on mass airflow (MAF) into an engine and engine vacuum.

In other features, the selectively enabling comprises enabling when the MAF is greater than a predetermined MAF for a predetermined period and the engine vacuum is less than a predetermined vacuum for the predetermined period.

In further features, the decay rate is calculated based on a change in the brake booster vacuum over the predetermined period.

In other features, the diagnostic method further comprises selectively reporting presence of a leak in a brake booster system based on the decay rate.

In further features, the diagnostic method further comprises preventing the reporting when at least one of a brake fluid pressure is greater than a predetermined pressure and the engine vacuum is greater than the brake booster vacuum.

In still further features, the diagnostic method further comprises preventing the reporting when a change in the brake fluid pressure is greater than a predetermined pressure change.

In other features, the diagnostic method further comprises applying a statistical filter to the decay rate and reporting the leak based on an output of the statistical filter.

In still other features, the statistical filter is an exponentially weighed moving average filter.

In further features, the reporting comprises reporting the leak when the output is greater than a predetermined value.

In still further features, the diagnostic method further comprises determining a size of the leak based on the output and reporting the size of the leak.

In other features, the diagnostic method further comprises activating operation of the engine based on the brake booster vacuum.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
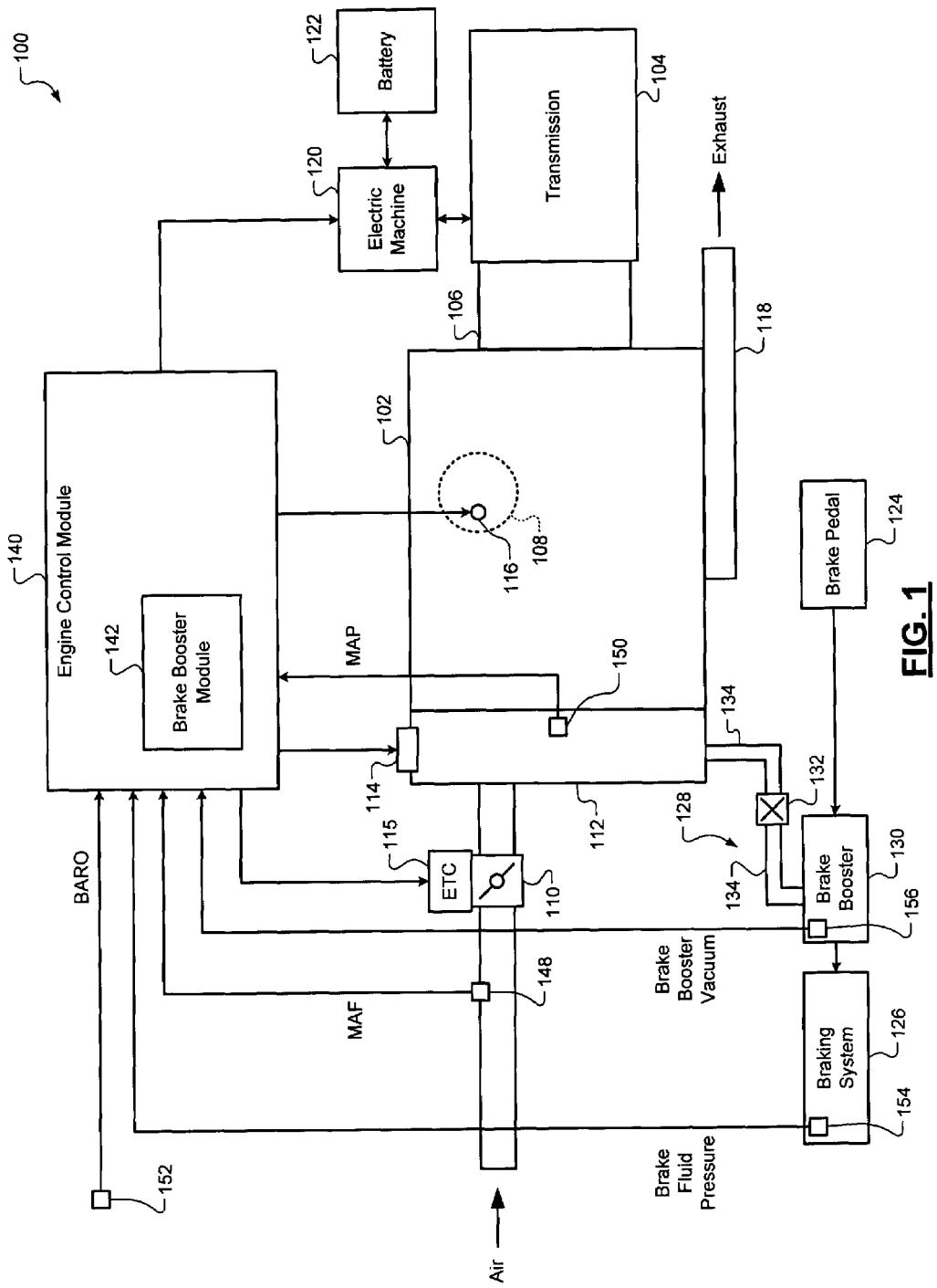
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A brake booster system of a vehicle includes a brake booster that receives vacuum (i.e., brake booster vacuum) from an engine. The brake booster assists a driver in performing vehicle braking. The brake booster vacuum, however, is released as a driver actuates a brake pedal. A leak in the brake booster system also causes the brake booster vacuum to be released.

A brake booster module according to the present application detects leaks in the brake booster system while the engine is running. More specifically, the brake booster module determines a decay rate of the brake booster vacuum when specified mass airflow (MAF) and engine vacuum conditions are present. The brake booster module determines whether a leak is present based on the decay rate of the brake booster vacuum.

Referring now to FIG. 1, an exemplary engine system 100 is shown. As can be appreciated, the brake booster leak detection methods and systems of the present disclosure can be used in various series and parallel hybrid vehicles. For exemplary purposes only, the brake booster leak detection methods and systems of the present disclosure are shown and will be discussed in the context of a parallel hybrid vehicle.

The engine system 100 includes an engine 102 that drives a transmission 104. The transmission 104 can be an automatic or a manual transmission that is driven by the engine 102 through a corresponding torque transfer device 106, such as a torque converter or a clutch. The engine 102 includes one or more cylinders, such as cylinder 108. For example, the engine 102 may have 2, 3, 4, 5, 6, 8, 10, 12 and/or 16 cylinders.

Air flows into the engine 102 through a throttle valve 110 into an intake manifold 112 and is combusted with fuel in the cylinder 108. The fuel is provided by a fuel injector 114. An electronic throttle controller (ETC) 115 controls opening of the throttle valve 110, thereby controlling airflow into the intake manifold 112. The fuel injector 114 may inject fuel into the intake manifold 112 at a central location or at multiple locations, such as near an intake valve (not shown) that is associated with the cylinder 108. Alternatively, the fuel injector 114 may inject fuel directly into the cylinder 108. In various implementations, one fuel injector is provided for each cylinder. Combustion may be initiated by, for example, a spark plug 116. Exhaust gas resulting from combustion is expelled to an exhaust system 118.

The engine system 100 further includes an electric machine 120 and a battery 122. The electric machine 120 operates in one of a motor mode and a generator mode. When operating in the motor mode, the electric machine 120 is powered by the battery 122. When in the motor mode, the electric machine 120 provides positive torque which assists the engine 102 and/or drives the transmission 104.

When operating in the generator mode, the electric machine 120 generates electrical energy to charge the battery 122. The electric machine 120 may be driven by the engine 102 and/or the transmission 104. As can be appreciated, the battery 122 can power other vehicle accessories in addition to the electric machine 120.

A vehicle operator manipulates a brake pedal 124 to regulate vehicle braking. More particularly, a braking system 126 adjusts vehicle braking (i.e., applies brakes) based on force applied to the brake pedal 124. In this manner, the braking system 126 assists the vehicle operator in regulating the speed of the vehicle. The braking system 126 receives assistance from a brake booster system 128.

Operation of the engine 102 causes a vacuum (i.e., low pressure relative to ambient air pressure) to form within the intake manifold 112. The brake booster system 128 includes a brake booster 130 that receives the vacuum from the intake manifold 112 through a one-way check valve 132. The brake booster 130 uses this vacuum to provide extra force to assist the braking system 126 in performing vehicle braking.

Vacuum is supplied to the brake booster 130 via a line 134 that extends from the intake manifold 112. The line 134 includes the check valve 132 that is configured to allow flow only from the brake booster 130 to the intake manifold 112. When the vacuum within the brake booster 130 (i.e., brake booster vacuum) is less than vacuum within the intake manifold 112 (i.e., engine vacuum), the check valve 132 opens, causing the brake booster vacuum to increase. When engine vacuum is less than the booster vacuum, the check valve 132 remains in a closed position, thereby maintaining the brake booster vacuum. Brake booster vacuum is depleted when brakes (not shown) of the braking system 126 are applied.

An engine control module (ECM) 140 controls combustion within the engine 102 and/or the operation of the electric machine 120. With respect to combustion, the ECM 140 controls airflow into the engine 102, the amount of fuel injected, and the timing of the spark. For example only, the ECM 140 may control the air and fuel to create a desired air/fuel mixture for combustion.

With respect to the electric machine 120, the ECM 140 may control activation and deactivation. For example only, the ECM 140 may coordinate deactivation of one or more cylinders of the engine 102 with activation of the electric machine 120. Such a deactivation of the engine 102 may be done to increase fuel efficiency. The ECM 140 may later activate the engine 102 when the brake booster vacuum falls below a predetermined vacuum. The engine 102 may then be operated until the brake booster vacuum is restored to an adequate level.

A leak in the brake booster system 128 causes the brake booster vacuum to decrease. As the ECM 140 may trigger activation of the engine 102 when the brake booster vacuum becomes low, a leak may cause the ECM 140 to activate the engine 102 when the engine 102 should otherwise remain deactivated. Thus, a brake booster leak can cause decreased fuel economy and/or increased emissions.

The ECM 140 includes a brake booster module 142 that detects the presence of a leak in the brake booster system 128, that determines the size of a detected leak, and that indicates whether a leak has been detected. The brake booster module 142 may also light an indicator, such as a "check engine" light, and/or store data for internal use. The vehicle operator may then take appropriate actions to repair a detected leak.

The brake booster module 142 is operable to detect brake booster leaks when the engine 102 is running and various engine operating conditions are satisfied. Satisfaction of the operating conditions may be based on mass air flowrate (MAF) and the engine vacuum. For example only, the operating conditions may be satisfied when the engine vacuum is less than a predetermined vacuum and the MAF is greater than a predetermined MAF.

The MAF is measured by a MAF sensor 148. The engine vacuum may be measured based on the difference between the vacuum within the intake manifold 112 and barometric (ambient) air pressure. A manifold absolute pressure (MAP) sensor 150 measures the vacuum within the intake manifold 112 and a barometric pressure sensor 152 measures the barometric air pressure.

The brake booster module 142 may also selectively refrain from detecting brake booster leaks. For example, the brake booster module 142 may refrain from detecting brake booster leaks when the brakes are being applied, as the brake booster vacuum should decrease during braking. The brake booster module 142 may also refrain from detecting leaks at other times when the brake booster vacuum is expected to change, such as when the check valve 132 is open.

In various implementations, the braking system 126 may employ a fluid (e.g., brake fluid) to regulate application of the brakes. In such an implementation, application of the brakes may be indicated by an increase in the pressure of the brake fluid (i.e., brake fluid pressure). A brake fluid pressure sensor 154 measures the brake fluid pressure and provides the brake fluid pressure to the brake booster module 142.

The brake booster module 142 detects leaks in the brake booster system 128 based on the brake booster vacuum while the engine 102 is operational. More specifically, the brake booster module 142 detects leaks in the brake booster system 128 based on a decrease in the brake booster vacuum over a period of time (i.e., a decay rate). The brake booster vacuum is measured and provided to the brake booster module 142 by a brake booster vacuum sensor 156.

Figure 2:
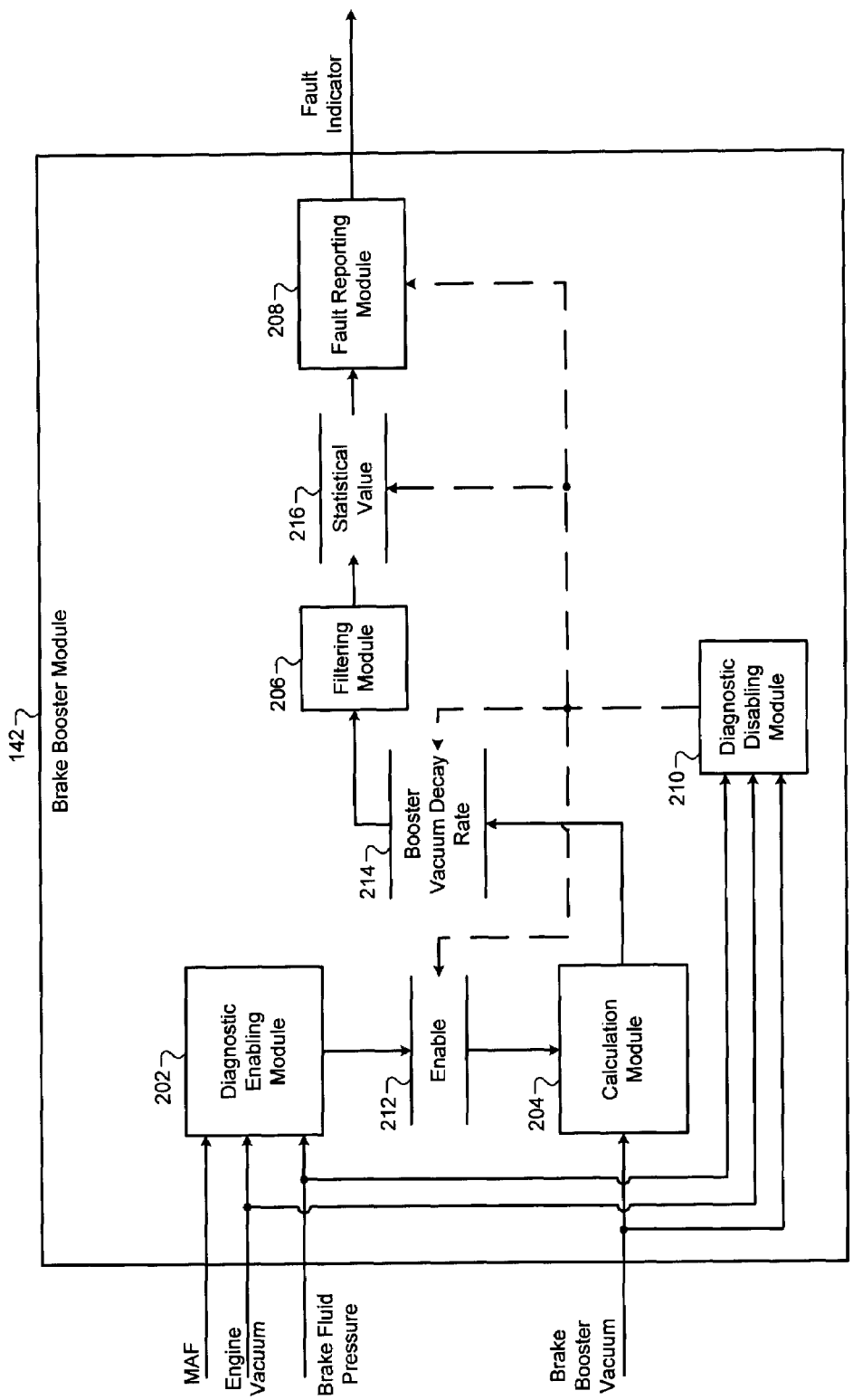
FIG. 2 is a functional block diagram of an exemplary brake booster module according to the principles of the present disclosure.

Referring now to FIG. 2, a dataflow diagram depicting an exemplary embodiment of the brake booster module 142 is presented. Various embodiments of the brake booster module 142 according to the present disclosure may include any number of sub-modules embedded within the brake booster module 142. As can be appreciated, the sub-modules shown may be combined and/or further partitioned to similarly detect a leak in the brake booster system 128. Inputs to the brake booster module 142 may be provided by various sensors of the engine system 100, received from other modules of the engine system 100, and/or determined by other sub-modules within the ECM 140. The inputs may be filtered (e.g., low pass filter) before being provided to the brake booster module 142.

The brake booster module 142 includes a diagnostic enabling module 202, a calculation module 204, a filtering module 206, a fault reporting module 208, and a diagnostic disabling module 210. The diagnostic enabling module 202 monitors engine and braking system parameters to determine whether specified operating parameters are satisfied. Monitored engine parameters may include, for example, the engine vacuum and the MAF. One monitored braking system parameter may include the brake fluid pressure, indicating whether the brakes are being applied.

The diagnostic enabling module 202 sets an enable flag 212 to TRUE when the engine and braking system parameters are satisfied. Otherwise, the enable flag 212 remains set to FALSE. In various implementations, the enable flag 212 may be a signal, a register location, a predetermined memory location, or any other suitable indicator.

For example only, the diagnostic enabling module 202 sets the enable flag 212 to TRUE when the MAF is greater than a predetermined MAF, the engine vacuum is less than a predetermined vacuum, and the brakes are not being applied. For example only, the predetermined MAF may be 15.0 g/s and the predetermined vacuum may be 40.0 kPa.

The brake booster vacuum signal is provided to the calculation module 204. The calculation module 204 evaluates the brake booster vacuum when the enable flag 212 is TRUE. More specifically, the calculation module 204 monitors the booster vacuum for a predetermined period of time.

During the period, the calculation module 204 may record the brake booster vacuum at various times. For example only, the calculation module 204 may record the brake booster vacuum at a predetermined rate, such as once every 100.0 ms. The calculation module 204 also determines a change in brake booster vacuum (i.e., a ΔBBV). For example only, the change in brake booster vacuum may be determined based on the difference between the brake booster vacuum measured at the time when the period began and the brake booster vacuum measured at the time when the period ended.

The calculation module 204 calculates a booster vacuum decay rate 214 based on the change in brake booster vacuum over the period of time. For example only, the booster vacuum decay rate 214 may be determined using the equation:

$$\text{Decay Rate} = \frac{\Delta BBV}{t}$$

Where Δ BBV is the change in brake booster vacuum and t is the period of time. For example only, t may be set equal to approximately 1.0 s or 2.0 s.

The filtering module 206 applies a statistical filter to the booster vacuum decay rate 214 and/or the recorded brake booster vacuums and determines a statistical value 216 based on the filtering. The filtering module 206 may apply, for example, an exponentially weighted moving average (EWMA) filter. For example only, the filtering coefficient of the EWMA filter may be approximately 0.02 or 0.03.

The fault reporting module 208 evaluates the statistical value 216 to determine whether a leak is present. A detected leak may be in the brake booster 130, the line 134, and/or the check valve 132. If the statistical value 216 is indicative of a leak, the fault reporting module 208 generates a fault indicator, which indicates that a leak is present. The fault indicator may also be generated to indicate information describing the leak and/or that the test has failed.

For example only, no leak may be present when the statistical value 216 is close to zero, or less than a predetermined value. A leak may be present when the statistical value 216 is greater than the predetermined value. For example only, the predetermined value may be approximately 0.08 or 0.09. The size of a detected leak increases as the statistical value 216 increases.

The diagnostic disabling module 210 selectively disables leak detection when specified conditions are met. For example only, the diagnostic disabling module 210 disables leak detection when the brake fluid pressure increases or when a change in brake fluid pressure occurs. Disabling leak detection under such conditions may be attributable to the expected brake booster vacuum decrease that occurs when the brakes are applied. The diagnostic disabling module 210 also disables leak detection when the engine vacuum is greater than brake booster vacuum. Disabling leak detection under such conditions may be attributable to the change in the brake booster vacuum that is expected when the check valve 132 is open.

To disable leak detection, the diagnostic disabling module 210 may, for example, set the enable flag 212 to FALSE. The diagnostic disabling module 210 may also reset the booster vacuum decay rate 214 and/or the statistical value 216. The booster vacuum decay rate 214 and the statistical value 216 may be reset to a predetermined reset value, such as 0.0.

Figure 3:
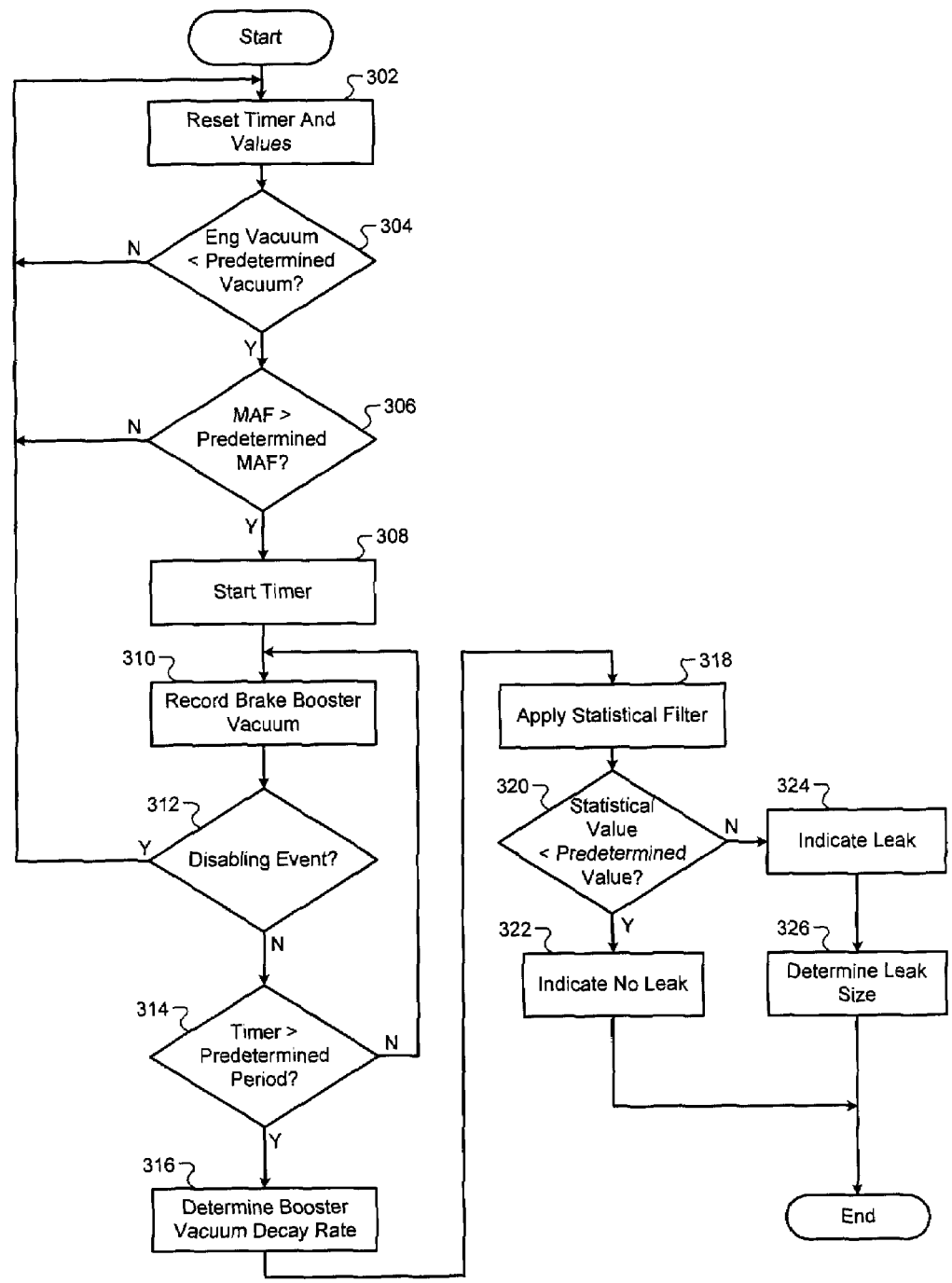
FIG. 3 is a flowchart depicting exemplary steps performed by the brake booster module according to the principles of the present disclosure.

Referring now to FIG. 3, a flowchart depicting exemplary steps performed by the brake booster module 142 is presented. Although the following steps are primarily described with respect to the embodiments of FIGS. 1 and 2, they may be modified to apply to other embodiments. As can be appreciated, the order of execution of the steps shown in FIG. 3 can vary without altering the spirit of the present disclosure. The steps of FIG. 3 may be performed periodically or scheduled to run based on the occurrence of specified events.

Control begins in step 302 where control resets the timer and values. For example only, the values may include any recorded brake booster vacuums, the booster vacuum decay rate 214, and/or the statistical value 216. The timer and/or the values may be reset to a predetermined reset value, such as 0.0.

Control continues in step 304 where control determines whether the engine vacuum is less than a predetermined vacuum. If true, control continues to step 306; otherwise, control returns to step 302. For example only, the predetermined vacuum may be approximately 40.0 kPa. The engine vacuum may be determined based on the MAP measured by the MAP sensor 150 and the barometric pressure measured by the barometric pressure sensor 152.

In step 306, control determines whether the MAF is greater than a predetermined MAF. If true, control continues to step 308; otherwise, control returns to step 302. In this manner, control proceeds and booster vacuum leak detection is enabled when the engine vacuum is less than the predetermined vacuum and the MAF is greater than the predetermined MAF. For example only, the predetermined MAF may be approximately 15.0 g/s.

In step 308, control starts the timer. The timer tracks the period elapsed after leak detection is enabled (i.e., when the engine operating conditions are satisfied). Control records the brake booster vacuum in step 310. In step 312, control determines whether a disabling event has occurred. If true, control returns to step 302; otherwise, control proceeds to step 314. For example only, the disabling events may include when the brake fluid pressure is greater than a threshold, when a change in the brake fluid pressure occurs, or when the engine vacuum is greater than brake booster vacuum.

In step 314, control determines whether the timer is greater than a predetermined period. If true, control continues to step 316; otherwise, control returns to step 310. For example only, the predetermined period may be approximately 1.0 s or 2.0 s. In this manner, control performs steps 310-316 until a disabling event occurs or the timer reaches the predetermined period. In step 316, control determines the booster vacuum decay rate based on the ΔBBV and the predetermined period. For example only, the ΔBBV may be based on the first and the last recorded brake booster vacuums.

In step 318, control applies the filter to the booster vacuum decay rate and/or the recorded booster vacuums. Application of the filter provides a robust diagnostic result and the statistical value is generated based on the values. Control proceeds to step 320 where control determines whether the statistical value is less than a predetermined value. If true, control proceeds to step 322; otherwise, control transfers to step 324. For example only, the predetermined value may be approximately 0.09 or 0.08.

When the brake booster system does not have a leak or the leak is minimal the statistical value is approximately equal to 0.0. In step 322, control indicates that a leak is not present and the test has passed. Control then ends. If the statistical value is greater than the predetermined value, in step 324 control indicates that a leak is present and the test has failed. Control indicates whether a leak is present via the fault indicator.

After step 324, control continues in step 326 where control determines the size of the detected leak. Control may determine the size of the leak based on the statistical value and/or the brake booster vacuum decay rate. For example only, the statistical value increases and is dependent upon the leak size. Control may also determine the size of the leak based on known parameters of the brake booster system 128, such as component dimensions, component layout, configuration, normal engine operating pressures, and/or any other suitable parameter.

Leak sizes may be detected, monitored, evaluated, and reported between lower and upper leak thresholds, which may vary per application and system. For example only, leak sizes may vary between approximately 0.013" and 0.065". A leak of less than approximately 0.013" may be considered a good or normal operating system (i.e., no leak). A leak of greater than approximately 0.065" may be reported by the ECM 140 and/or may be detected and reported by another monitoring system.

As can be appreciated, once the fault indicator is generated to indicate that a leak is present, additional steps can be performed to notify other systems and/or users of the leak. In various embodiments, a diagnostic code is set, which can be retrieved by a service tool or transmitted to a remote location via a telematics system. In various other embodiments, an indicator lamp is illuminated based on the report status and/or an audio warning signal is generated based on the report status.

The above-described embodiments provide a brake booster system that is emission compliant and a brake booster leak detection system that detects leaks in the brake booster system while the engine is running. The start or initial brake booster vacuum has minimal to no impact on detection of leaks as the engine operating conditions are likely not satisfied when the engine is started. The accurate detection aids in ensuring proper fuel economy.

As can be appreciated, all comparisons discussed above can be implemented in various forms depending on the selected values for comparison. For example, a comparison of "greater than" may be implemented as "greater than or equal to" in various embodiments. Similarly, a comparison of "less than" may be implemented as "less than or equal to" in various embodiments.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A leak diagnostic system for a vehicle, comprising:
a calculation module that calculates a decay rate of a brake booster vacuum; and
a diagnostic enabling module that selectively enables said decay rate calculation in response to a determination that both (i) mass airflow (MAF) into an engine is greater than a predetermined MAF and (ii) engine vacuum is less than a predetermined vacuum.

2. The leak diagnostic system of claim 1 wherein said diagnostic enabling module enables said decay rate calculation when said MAF is greater than said predetermined MAF for a predetermined period and said engine vacuum is less than said predetermined vacuum for said predetermined period.

3. The leak diagnostic system of claim 2 wherein said calculation module calculates said decay rate based on a change in said brake booster vacuum over said predetermined period.

4. The leak diagnostic system of claim 1 further comprising a fault reporting module that selectively reports a presence of a leak in a brake booster system based on said decay rate.

5. The leak diagnostic system of claim 4 further comprising a diagnostic disabling module that prevents said reporting when at least one of a brake fluid pressure is greater than a predetermined pressure and said engine vacuum is greater than said brake booster vacuum.

6. The leak diagnostic system of claim 5 wherein said diagnostic disabling module prevents said reporting when a change in said brake fluid pressure is greater than a predetermined pressure change.

7. The leak diagnostic system of claim 4 further comprising a filtering module that applies a statistical filter to said decay rate,
wherein said fault reporting module reports said leak based on an output of said statistical filter.

8. The leak diagnostic system of claim 7 wherein said statistical filter is an exponentially weighed moving average filter.

9. The leak diagnostic system of claim 7 wherein said fault reporting module reports said leak when said output is greater than a predetermined value.

10. The leak diagnostic system of claim 9 wherein said fault reporting module determines a size of said leak based on said output and reports said size of said leak.

11. The leak diagnostic system of claim 1 wherein operation of said engine is activated based on said brake booster vacuum.

12. A diagnostic method comprising:
calculating a decay rate of a brake booster vacuum using a calculation module; and
selectively enabling said calculating, using a diagnostic enabling module, in response to a determination that both (i) mass airflow (MAF) into an engine is greater than a predetermined MAF and (ii) engine vacuum is less than a predetermined vacuum.

13. The diagnostic method of claim 12 wherein said selectively enabling comprises enabling when said MAF is greater than said predetermined MAF for a predetermined period and said engine vacuum is less than said predetermined vacuum for said predetermined period.

14. The diagnostic method of claim 13 wherein said decay rate is calculated based on a change in said brake booster vacuum over said predetermined period.

15. The diagnostic method of claim 12 further comprising selectively reporting a presence of a leak in a brake booster system based on said decay rate.

16. The diagnostic method of claim 15 further comprising preventing said reporting when at least one of a brake fluid pressure is greater than a predetermined pressure and said engine vacuum is greater than said brake booster vacuum.

17. The diagnostic method of claim 16 further comprising preventing said reporting when a change in said brake fluid pressure is greater than a predetermined pressure change.

18. The diagnostic method of claim 15 further comprising:
applying a statistical filter to said decay rate; and
reporting said leak based on an output of said statistical filter.

19. The diagnostic method of claim 18 wherein said statistical filter is an exponentially weighed moving average filter.

20. The diagnostic method of claim 18 wherein said reporting comprises reporting said leak when said output is greater than a predetermined value.

21. The diagnostic method of claim 20 further comprising:
determining a size of said leak based on said output; and
reporting said size of said leak.

22. The diagnostic method of claim 12 further comprising activating operation of said engine based on said brake booster vacuum.

* * * * *